United States Patent [19]

Clayton et al.

[11] Patent Number: 5,073,004
[45] Date of Patent: Dec. 17, 1991

[54] TUNABLE OPTICAL FILTER

[75] Inventors: Jane B. Clayton, Suwanee; Muhammad A. El, Lithonia; Lucius J. Freeman, Hartwell; Calvin M. Miller, Atlanta, all of Ga.

[73] Assignee: AT&T Bell Laboratories, Murray Hill, N.J.

[21] Appl. No.: 525,417

[22] Filed: May 18, 1990

[51] Int. Cl.[5] .............................................. G02B 6/38
[52] U.S. Cl. ..................................... 385/27; 356/352; 385/50; 385/72
[58] Field of Search ............... 350/96.21, 96.15, 96.29, 350/163, 311, 315; 356/352

[56] References Cited

U.S. PATENT DOCUMENTS

| | | | |
|---|---|---|---|
| 4,285,571 | 8/1981 | Winzer | 350/96.21 X |
| 4,383,732 | 5/1983 | Dalgoutte et al. | 350/96.2 |
| 4,830,451 | 5/1989 | Stone | 350/96.15 |
| 4,861,136 | 8/1989 | Stone et al. | 350/96.3 |

FOREIGN PATENT DOCUMENTS

| | | | |
|---|---|---|---|
| 0075704 | 4/1983 | European Pat. Off. | 350/96.15 |
| 2138161 | 10/1984 | United Kingdom | 350/96.2 |

OTHER PUBLICATIONS

IEEE Journal Quantum Electronics, vol. QE-17, No. 11, Nov. 1981, pp. 2168-2120, S. T. Petuchowski et al., "A Sensitive Fiber-Optic Fabry-Perot Interfometer".
Electronics Letters, vol. 21, No. 11, May 23, 1985, pp. 504-505, J. Stone, "Optical-Fiber Fabry-Perot Interferometer with Finesse of 300".
J. Stone and L. W. Stulz, "Pigtailed High-Finesse Tunable Fiber Fabry-Perot Interferometers with Large, Medium and Small Free Spectral Ranges", *Electronics Letters*, 23 May 1985, vol. 21, No. 11, pp. 504-505.
B. Glance et al., "Fast Frequency-Tunable External Cavity Laser", *Electronics Letters*, Jan. 29, 1987, pp. 98-99.
I. P. Kaminow et al., 8th Oct. 1987, *Electronics Letters*, vol. 23, No. 21, pp. 1102-1103, "FMD-FSK Star Network with a Tunable Optical Filber Demultiplexer".
D. Marcuse et al., "Coupling Efficiency of Front Surface and Multilayer Mirrors as Fiber-End Relectors",

*Journal of Lightwave Technology*, vol. LT-4, No. 4, Apr. 1986, pp. 377-381.
T. Kohno et al., "A Balloon-Borne Fabry-Perot Interference Spectrometer", *Optics Communication*, vol. 17, Nov. 3 Jun. 1976, pp. 297-301.
D. L. Franzen et al., "Long Optical-Fiber Fabry-Perot Interferometers", *Applied Optics*, vol. 20, No. 23, Dec. 1, 1981, pp. 3991-3992.
S. Mallinson, "Wavelength-Selective Filters for Singel-Mode Fiber WDM Systms Using Fabry-Perot Interferometers", *Applied Optics*, vol. 26, No. 3, Feb. 1, 1987, pp. 430-436.
R. Wyatt et al., "20 KHZ Linewidth 1.5 um InGaAsP External Cavity Laser with 55 um Tuning Range", *Electronic Letters*, vol. 19, No. 3, Feb. 3, 1983, pp. 110-112.
W. Iuma et al., "Control of Mirror Position in a High Precision Intefereometer", Journal of Physical E. Scientific Instruments 1973, pp. 169-170.

Primary Examiner—John D. Lee
Assistant Examiner—John Ngo
Attorney, Agent, or Firm—E. W. Somers

[57] ABSTRACT

A tunable fiber Farby-Perot interferometer includes two aligned ferrule assemblies (22—22) having adjacent end faces separated by a gap. Each assembly includes a mirror (40) disposed transverse to a longitudinal axis (28) of the assembly and embedded internally therein adjacent to the exposed end surfaces which defines the gap. Each ferrule assembly is held in a sleeve (74) disposed in an end fixture (70) with a piezoelectric transducer system (44) extending between end fixtures. Means (82—82) are provided in each end fixture for deforming slightly the sleeve to cause the ferrule assembly disposed therein to be moved into alignment with the other. The transducer system is operated to adjust the length of the gap between the exposed adjacent end faces. Also, the facilities including the transducer system are provided such that a portion or portions of it may be operated selectively to fine tune further the alignment between the fibers.

11 Claims, 3 Drawing Sheets

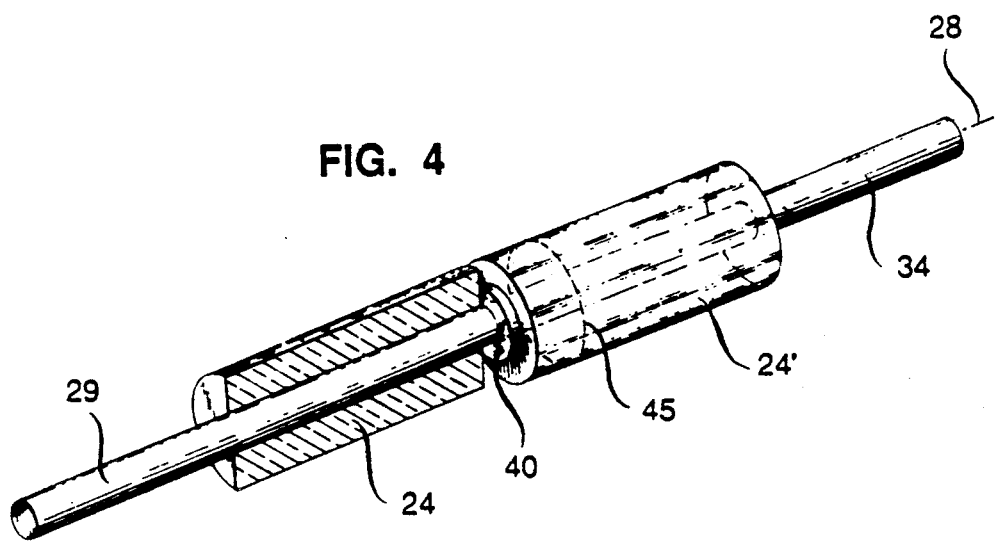
FIG. 4
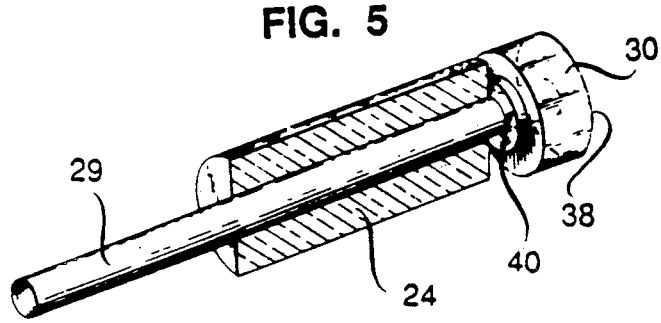
FIG. 5
FIG. 6
(PRIOR ART)
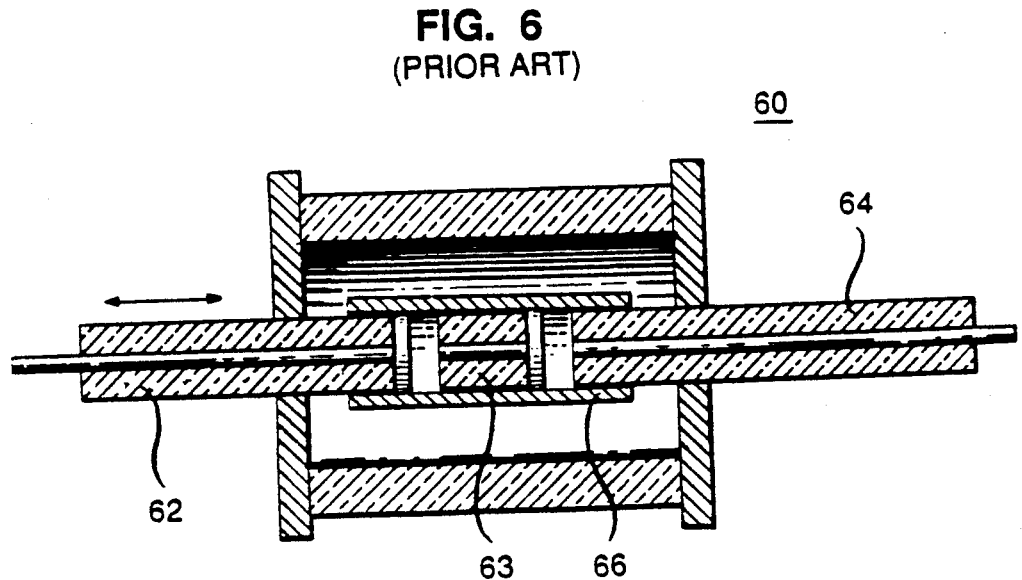

TUNABLE OPTICAL FILTER

TECHNICAL FIELD

This invention relates to a tunable optical filter. More particularly, the invention relates to a fiber Fabry-Perot interferometer which is tunable over a desired range to provide a desired bandwidth.

BACKGROUND OF THE INVENTION

In currently used optical transmission systems, optical signals are converted to electronic ones before processing occurs. Such processing involves the use of standard electronic devices. In the next generation of optical communication systems, it is envisioned that optical signals will be processed without conversion to electronic signals. Such optical processing will require optical devices which are analogous to devices such as amplifiers, modulators, filters, multiplexers, demultiplexers, for example, which are used for processing electronic signals.

A tunable optical filter having a bandwidth between about 100 MHz and a few tens of gigahertz with low insertion loss and being easily manufacturable would be an important component in wavelength multiplexing as well as in many other applications. It appears that the most promising approach to such a device is a fiber Fabry-Perot interferometer which may be referred to as an FFP.

A Fabry-Perot interferometer is an optical device which can be used to process optical signals and includes two mirrors with a cavity therebetween. The Fabry-Perot interferometer is discussed, for example, in Born and Wolf, *Principles of Optics*, MacMillan, 1959, pages 322-332. An exemplary Fabry-Perot structure comprises a region bounded by two plane, parallel mirrors. The structure exhibits low loss, that is, it passes only particular wavelengths for which the cavity is said to be in resonance—a condition obtained by adjusting appropriately the cavity parameters. At resonance, the cavity passes a series of equally spaced wavelengths. The spacing between these wavelengths, called the free spectral range or tuning range of the cavity (FSR), is a function of the spacing between the mirrors and the index of refraction of the medium between the mirrors. The tuning range of a Fabry-Perot interferometer is equal to $c/2nl_c$ where $l_c$ is used to designate the length of the cavity. Accordingly, the shorter the cavity, the larger the tuning range. The bandwidth is largely determined by the reflectivity of the mirrors; however, other sources of loss and reflections can affect bandwidth. Another parameter which is designated finesse is equal to the quotient of the tuning range divided by the bandwidth.

The use of Fabry-Perot cavities as filters in commercial optical fiber communication systems to process optical signals is known. However, the use of such devices has been hampered by, among other constraints, the lack of practical designs which have suitable characteristics, such as low loss when used with optical fibers, appropriate values of free spectral range and suitable means for tuning the devices and maintaining alignment of the optical fiber end portions.

Designs that more closely meet the needs of a commercial fiber system have been suggested. In *Electronics Letters*, Vol. 21, 76.11, pp. 504-505 (May 12, 1985), J. Stone discussed a fiber Fabry-Perot interferometer design in which the cavity comprised an optical fiber waveguide segment with mirrored ends. The free spectral range of the resulting cavity is determined by the length of the fiber segment. The cavity can be tuned over one free spectral range by changing the cavity optical length by one-half the wavelength value of the light entering the cavity. In this way, the cavity can be tuned to resonate at, and therefore transmit light of different wavelength values. To obtain such tuning, the cavity length can be changed, for example, by means of a piezoelectric element attached to the fiber, which, when activated, will stretch the fiber and increase the associated cavity optical length accordingly. Fiber Fabry-Perot interferometers can be made with a finesse up to 500 with relatively low insertion loss, using separately attached mirrors.

In an article entitled "Pigtailed High-Finesse Tunable Fiber Fabry-Perot Interferometers With Large, Medium and Small Free Spectral Ranges", authored by J. Stone and L. W. Stulz, appearing in the July 16, 1987 issue of *Electronics Letters* beginning at page 781, the authors disclosed that fiber Fabry-Perot devices with any required bandwidths can be fabricated from one of three types of structures, Types 1, 2 and 3, reported in that article.

A Type 1 structure reported by Stone and Stulz is a fiber resonator. Mirrors are deposited on both ends of a continuous fiber and tuning is achieved by changing the optical length of the fiber. This type of fiber Fabry-Perot interferometer generally is limited to a length greater than 1 to 2 cm which equates to a free spectral range on the order of 10 to 5 GH$_z$. Although no alignment is required, the bandwidth range is limited to less than 100 MHz for a finesse of 100 and an $l_c$ of 1 cm.

Among the advantages of the Type 1 fiber Fabry-Perot interferometer is the fact that the cavity comprises an optical fiber which is a waveguide. This eliminates deleterious diffraction effects present in long Fabry-Perot cavities which are not waveguides. The elimination of the deleterious diffraction effects is associated with the guiding characteristics of the fiber. However, the difficulty of working with and stretching small lengths of optical fiber precludes large values of free spectral range when using a Type 1 fiber Fabry-Perot. As a result, the usefulness of the Type 1 fiber Fabry-Perot design is somewhat limited.

A Type 2 fiber Fabry-Perot interferometer is a gap resonator with mirrors deposited on adjacent end faces of two optical fibers. In this type of filter, the diffraction loss between the fibers limits the resonator gap to less than 10 $\mu$m which corresponds to a free spectral range greater than 10,000 GH$_2$ or approximately 750 Å.

Large free spectral ranges can be obtained by using a Type 2 fiber Fabry-Perot interferometer in which the cavity comprises a small gap. However, because of diffraction losses, larger gap cavities are less practical, and therefore the Type 2 Fabry-Perot interferometer is not adequate for applications which require the smaller free spectral ranges otherwise associated with larger gaps. Unacceptable losses result from gaps in excess of 10 $\mu$m.

A Type 3 structure is an internal waveguide resonator. A mirror film is applied to an end of one external fiber disposed in the passageway of a ferrule and another to one end of an internal waveguide. The ferrule which supports the external fiber is movably mounted in a sleeve in which also is disposed the internal waveguide and another ferrule in which an optical fiber is disposed. A relatively small gap separates the mirrored end of the external waveguide and an unmirrored end of the internal waveguide. Scanning is accomplished by changing the spacing of the small gap between the mirror film at the end of the external fiber and the internal waveguide. The free spectral length is determined by the length of the internal waveguide which can be made in lengths as short as 1 mm or less. An anti-reflection coating may be applied to the non-mirrored end of the internal waveguide. Although the Type 3 fiber Fabry-Perot interferometer covers the most practical range of frequencies, it may be somewhat difficult to manufacture because of the lengths of the internal waveguide.

In each of the above-described three types of Fabry-Perot interferometers, the fiber ends are disposed in standard glass or ceramic ST® connector ferrules. Afterwards, the ends are polished and coated with multi-layer dielectric mirrors. The ferrules are held in alignment with either a split or solid zirconia sleeve and the assembly is mounted in a piezoelectric shell which is attached to the ferrules. Should a fiber connection be needed, it may be carried out by connecting ST or rotary splice connectors to the outer ferrule ends for the Type 1 or to fiber pigtails for Types 2 or 3.

In commonly assigned application Ser. No. 07/466,536 which was filed on Jan. 17, 1990 in the names of J. B. Clayton and C. M. Miller, a resonant cavity approach was used to obtain desired sharp filtering. In order to obtain a desired tuning range and bandwidth, the cavity length may range between a few microns and several millimeters.

The filter of the above-identified application Ser. No. 07/466,536 comprises first and second ferrule assemblies each having aligned passageway portions in which is disposed optical fiber. The passageway portions of each ferrule assembly are spaced apart by a mirror which is normal to a longitudinal axis of the passageway portions and which is closer to one end of the ferrule assembly than to an opposite end thereof. The first and second ferrule assemblies are held with the axes of the passageways aligned and with the one end of said first ferrule assembly being adjacent the one end of said second ferrule assembly and with the adjacent one ends of the ferrule assemblies having a predetermined axial spacing. The mirrors of the ferrule assemblies extend over only a portion of the transverse cross-sectional area of an associated ferrule.

In the preparation of the filter just described, two ferrules each having a passageway therethrough with optical fiber disposed therein and one of which has a mirror formed on one of the end faces thereof are aligned, using an active alignment process by measuring power, and then are bonded together with the mirror therebetween. Then one of the ferrules is severed to provide a wafer having a newly formed end surface which is polished. Two such wafered ferrules which are referred to as ferrule assemblies are positioned with the passageways aligned and with the mirrors being adjacent to each other. With such a construction, only a few percent of the light at a non-resonant wavelength is passed through each mirror. All reflections in the resonant cavity add in phase and a relatively low throughput loss is achieved. By changing the cavity length, that is, the distance between the mirrors, tuning capability is provided.

The problem is to obtain a very sharp narrow band optical filter with cavity lengths tunable from a few microns to several millimeters which correspond to bandwidths between a few tens of gigahertz and approximately 100 $MH_z$ with a stable repeatable design that is relatively easy to manufacture with high yield. One can appreciate the complexity of the problem when using single mode optical fiber. There with a core diameter of 8 microns or less, at a finesse of 100, the light beams propagate back and forth approximately 100 times before passing through the resonant cavity. As a result, the arrangement must be 100 times more sensitive to alignment than single mode optical fiber.

The problem is that of providing a fiber Fabry-Perot interferometer with the capability of adjusting the gap between the exposed end faces of the wafers to tune the interferometer. Also, the sought after device is an optical filter which includes facilities for adjusting the alignment of the fiber end portions, particularly in view of the longitudinal relative movement therebetween, in order to achieve low loss. Still further, the sought after optical filter has a relatively high extinction or contrast ratio, that is, one which has a large difference between the passband and the stopband insertion loss.

SUMMARY OF THE INVENTION

The foregoing problems of the prior art have been overcome by the tunable optical filter of this invention. An optical filter of this invention which is capable of having a desired bandwidth comprises a first ferrule assembly which includes a ferrule having aligned passageway portions in which is disposed optical fiber. The passageway portions are spaced apart by a mirror which is normal to a longitudinal axis of the passageway portions, and which is substantially closer to one end of the first ferrule assembly than to an opposite end thereof. A second ferrule assembly also has aligned passageway portions for receiving optical fiber. As in the first ferrule assembly, the passageway portions in the second ferrule assembly are spaced apart by a mirror which is normal to a longitudinal axis of the passageway portions in the second ferrule assembly and which is substantially closer to one end of the second ferrule assembly than to an opposite end thereof. Also included are end fixtures including sleeves for holding the first and second ferrule assemblies with the axes of the passageways aligned and with the one end of said first ferrule assembly being adjacent to the one end of said second ferrule assembly and for causing adjacent one ends of the ferrule assemblies to have a predetermined axial spacing. The mirrors of the ferrule assemblies extend over only a portion of the transverse cross-sectional area of the associated ferrule.

By changing the cavity length, that is, the distance between the mirrors, tuning capability is provided. Only a small change in cavity length allows peaks of the frequency response curve to be shifted to any frequency within the tuning range.

The ferrule assemblies and the sleeves are held in alignment by a supporting arrangement which includes a piezoelectric transducer system. The fiber Fabry-Perot interferometer is mounted in the end fixtures with piezoelectric crystals, which comprise a transducer system, extending between the end fixtures. The sleeve associated with each ferrule assembly is mounted in an associated one of the fixtures. Mounting fasteners in the end fixtures between which is disposed the piezoelectric transducer system contact the ferrules which hold the fiber.

The supporting arrangement and the transducer system provide the capability of carrying out a fine alignment and tuning of the ferrule assemblies. Threaded alignment members, which may be referred to as alignment set screws, engage an associated sleeve. When the alignment members are turned to move them radially inwardly, they deform slightly the associated sleeve to cause a mechanical fine alignment of the fibers in the ferrule assemblies. The position of the fibers in a longitudinal direction can be adjusted electronically to tune the filter by operating the transducer system. A voltage is impressed on the transducer system that causes the cavity to be expanded or contracted. Hence, the filter not only provides peaks which are extremely sharp, but, also, the filter is tunable.

BRIEF DESCRIPTION OF THE DRAWING

Other features of the present invention will be more readily understood from the following detailed description of specific embodiments thereof when read in conjunction with the accompanying drawings, in which:

FIGS. 4 and 5 depict the subsequent steps in the method of making the optical fiber filter of FIG. 1;

FIG. 6 is a schematic view of a prior art optical filter;

DETAILED DESCRIPTION

Figure 1:
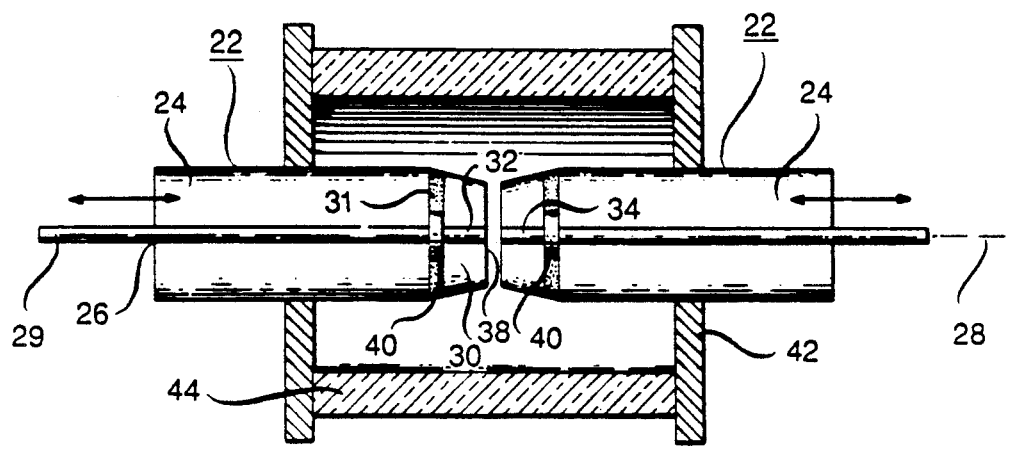
FIG. 1 is a schematic view of a tunable optical filter of this invention.

Referring now to FIG. 1, there is shown schematically an optical filter of this invention which is designated generally by the numeral 20. The filter 20 comprises two ferrule assemblies each of which is designated generally by the numeral 22.

Each ferrule assembly 22 includes a cylindrically shaped ferrule 24 which has a passageway 26 extending along a longitudinal axis 28 thereof. In a preferred embodiment, the ferrule 24 is made of Pyrex ® glass and is about 2 cm in length. An optical fiber 29 is disposed in the passageway 26 of the ferrule assembly. The optical fiber 29 extends beyond an end of the ferrule 24 to facilitate connection to other devices or fiber.

Each ferrule assembly 22 also includes a wafer 30 which is attached to one end of the ferrule 24. The wafer 30 also includes a passageway 32 which is aligned with the passageway 26 of the associated ferrule 24. Disposed in the passageway 32 of the wafer 30 is a length of optical fiber 34. Interposed between the wafer 30 and the ferrule 24 of each ferrule assembly 22 is a mirror 40.

The mirror 40 is comprised of alternating material layers at least one of which is a dielectric material. The mirror may comprise alternating layers of two different dielectric materials such as, for example, titanium dioxide and silicon dioxide. Or, the mirror may comprise alternating layers of a metallic material and/or a dielectric material. In a preferred embodiment, the mirror is comprised of alternating layers of silicon and silicon dioxide.

As can be seen in FIG. 1, each of the two ferrule assemblies is supported to cause the passageways of the ferrule assemblies to be aligned. Further, the ferrule assemblies 22—22 are supported to cause exposed end faces 38—38 of the wafers 30—30 to have a desired longitudinal positioning with respect to each other.

Each of the ferrule assemblies 22—22 is shown mounted in a support 42 depicted schematically in FIG. 1 to allow the ferrule assemblies to be movable with respect to each other in a direction along the aligned longitudinal axes. The movement may be accomplished by use of a piezoelectric transducer system 44 which may be operated to control the spacing between the exposed end faces of the wafers 30—30.

Figure 2:
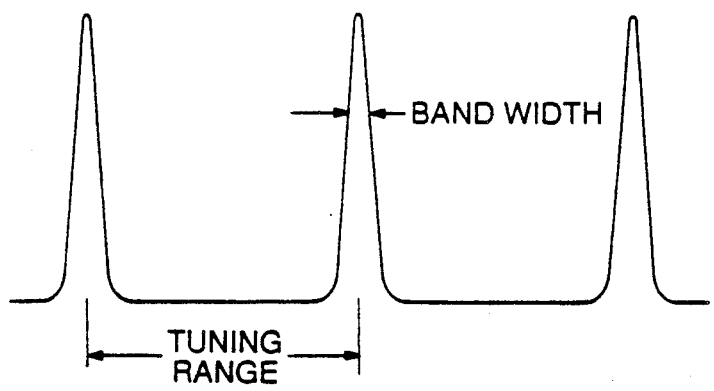
FIG. 2 depicts a frequency plot which is achieved with the optical fiber filter of this invention.

The optical filter of this invention may be used when it is desired to select a narrow band of wavelengths (see FIG. 2) such as, for example, for a frequency discriminator in a frequency shift keying (FSK) system. Such a system is discussed in detail in copending commonly assigned application Ser. No. 07/466,536 which was filed on Jan. 17, 1990 in the names of J. B. Clayton and C. M. Miller and which is incorporated by reference hereinto.

In the manufacture of a fiber Fabry-Perot interferometer of this invention, an end portion of an optical fiber 29 is inserted into the passageway 26 within a first cylindrically shaped ferrule 24 or capillary tube as it is often called (see FIG. 3) and an end portion of another optical fiber into a passageway within a second ferrule 24'. Then, an end face of each ferrule is ground and polished.

Figure 3:
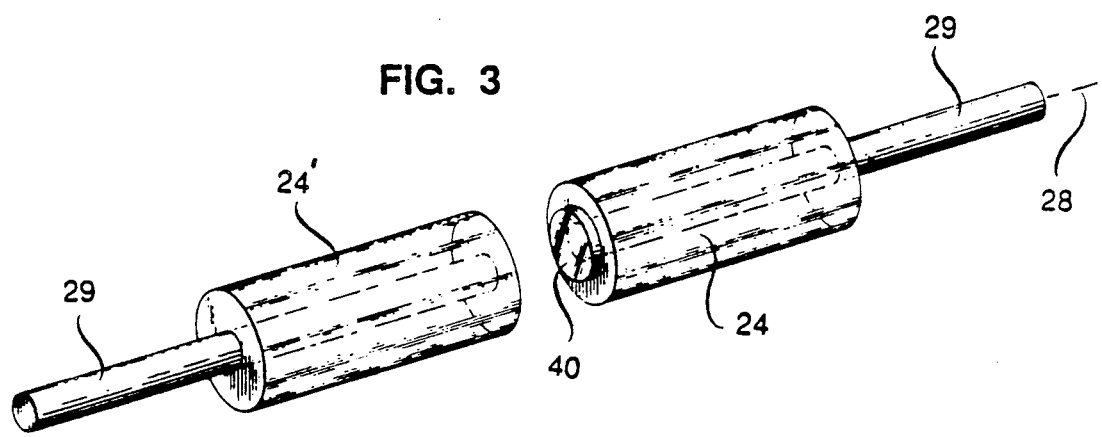
FIG. 3 depicts a first step of a method of making the optical fiber filter of FIG. 1.

Subsequently, a portion of the end surface of the first one of the ferrules is provided with a mirror 40 (see again FIG. 3). The mirror is such that it has a relatively high reflectivity, i.e. on the order of 95 to 99%. Preferably, it is a multilayer mirror with alternating layers of silicon and silicon dioxide used to form the mirror. Preferably, the number of layers is small to minimize diffraction. The provision is important because the quality of this device is directly related to the quality of the mirror. Also, it should be observed from FIG. 3 that the mirror 40 covers only a portion of the end surface of the ferrule 24.

After the end surface of the first one of the two ferrules is provided with a mirror, the two ferrules are positioned to align the optical fibers within the passageways. Once aligned, the ferrule end surfaces are bonded together such that the mirror on the end surface of one is bonded to the end surface of the other (see FIG. 4). Preferably, an ultraviolet light curable epoxy adhesive material is used. Because a mirror is formed over only a part of the end surface of the ferrule, there is sufficient area over which to bond the one ferrule 24 to the other, unmirrored ferrule 24'. Then the assembly of two ferrules, one mirrored, is severed by cutting through the mirrored first ferrule 24 along a plane 45 which is normal to the longitudinal centerline axis 28 of the ferrule and at a relatively short distance from the mirror to provide a portion which has been referred to hereinbefore as a wafer and which has the new end surface 38 (see FIG. 5 and also FIG. 1). The end surface 38 may be beveled as shown in FIG. 1.

The foregoing operations are repeated with another two ferrules each having an optical fiber disposed in a passageway of each to provide another ferrule assembly.

Afterwards, the two ferrule assemblies 22—22 are mounted in the support 42 such that the two newly formed end surfaces 38—38 are disposed adjacent to each other. The distance between the newly formed end surfaces 38—38 can be anywhere from about zero to about a few microns. The distance between each mirror and its associated end face can be as small as about 10 microns. Provided by the just-described structure is a fixed wavelength optical filter.

As will be recalled, the optical filter of this invention is tunable. Interconnecting two ends of the supports on each side of the two aligned portions is the piezoelectric transducer system 44. The piezoelectric transducer provides the fiber Fabry-Perot interferometer with the capability of being tuned. By impressing a voltage on the transducer, the width of the gap between the newly formed end faces 38—38 of the wafers 30—30 can be changed. The higher the voltage which is impressed across the transducers, the wider the gap between the two adjacent newly formed end surfaces.

The arrangement of this invention differs from a Type 3 fiber Fabry-Perot interferometer 60 disclosed in the above-identified article by Stone and Stulz (see FIG. 6). This invention makes the Type 3 fiber Fabry-Perot interferometer discussed in the hereinbefore identified Stone-Stulz article more manufacturable. The prior art Type 3 design (see again FIG. 6) included three components, an external waveguide 62, an internal waveguide 63 and a fixed waveguide 64, with a sleeve 66 for aligning the three components. The internal segment is fixed in position with respect to the fixed ferrule 64 using the sleeve 66 for alignment. The external waveguide ferrule 62 is movable with respect to the internal waveguide 63. Internal segments shorter than about a millimeter were impractical to handle separately. In the interferometer of the present invention, mirrored ferrules are aligned and bonded to unmirrored ferrules and subsequently cut, ground and polished to produce a wafered ferrule.

Important to the tunable filter of this invention is the support arrangement for the ferrule assemblies 22—22 to facilitate the alignment and tuning of the optical fibers within the passageways. To this end, the interferometer 20 includes two end fixtures 70—70 (see FIGS. 7 and 8) connected together by the transducer system 44. Each of the fixtures 70—70 includes four arms 71—71 each extending radially at 90° from adjacent ones from a hub 73. Through each hub 73 extends an opening 72 in which is mounted an inner sleeve 74 having a stepped configuration. A large diameter portion 76 is press fitted into the hub 73. A small diameter portion 78 extends toward an outer end of the hub 73. Supported in each sleeve 74 is a ferrule assembly 22 described hereinbefore.

A plurality of threaded mounting fasteners such as mounting set screws 80—80 which are spaced about the circumference of the hub 73 extend through the hub 73 and through the inner sleeve 74 and engage the ferrules 24—24 (see FIG. 8) of the ferrule assemblies 22—22. Each of the mounting set screws 80—80 is provided with a tip portion which is made of a plastic material such as nylon for engaging the ferrule 24. The mounting set screws 80—80 are effective to hold the ferrule assemblies within the hubs 73—73.

Figure 7:
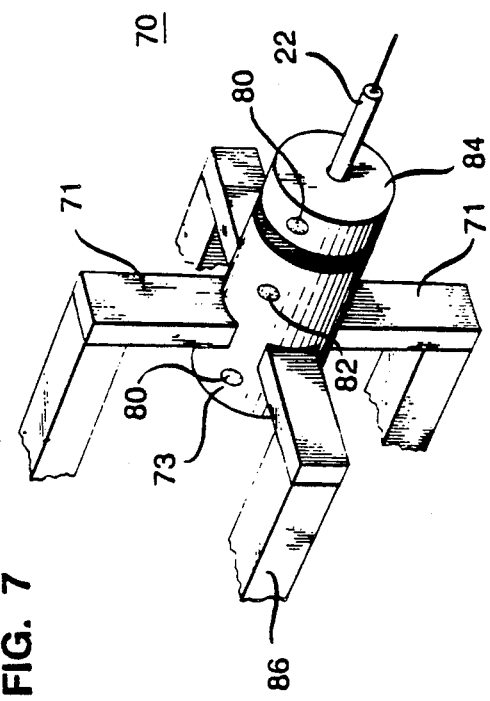
FIG. 7 is a perspective view of a mounting arrangement including four arms for a tunable optical filter.
Figure 8:
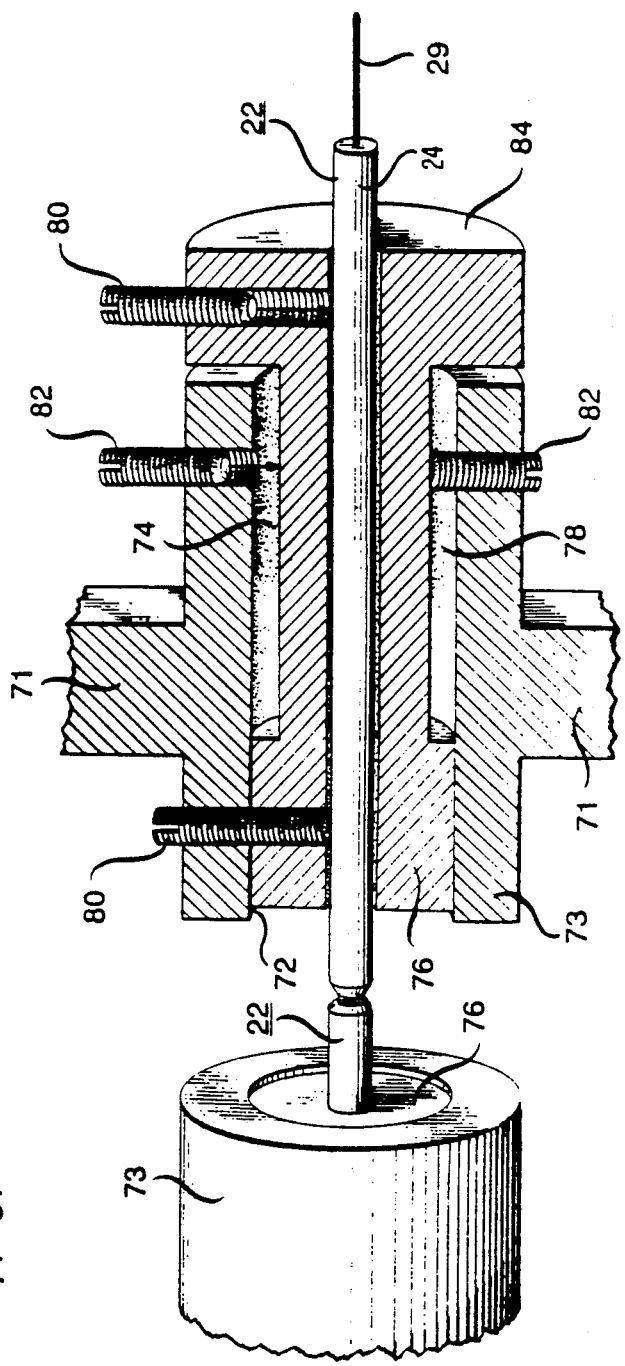
FIG. 8 depicts an elevational view of the mounting arrangement of FIG. 7 with arm portions of the arrangement having been rotated for illustrative purposes only.

Further, as can be seen in FIGS. 7 and 8, the inner sleeve 74 includes a flange 84 through which extend additional mounting set screws 80—80 to engage the ferrules. Such a flange is not necessary if the wall of the inner sleeve were thick enough to allow a threaded hole to be found therethrough to receive a mounting screw.

Also provided is a system of threaded members 82—82 which are used for alignment. These may be alignment set screws which preferably are made of metal. As can be seen in FIG. 8, each alignment set screw 82 is turned through an end hub 73 and engages the inner sleeve 74. After the ferrule assemblies 22—22 have been mounted in the end hubs 73—73, the turning of the alignment set screws 82—82 deforms slightly the inner sleeve. This causes realignment of the ferrules. Hence, any offset of the ferrules and hence of the fibers in the passageways may be adjusted by a turning of the adjustment screws 82—82 to provide a lateral alignment component of what may be referred to as a mechanical fine alignment.

Further, the interferometer is provided with the piezoelectric transducer system 44 positioned between and connected to the end fixtures 70—70. The transducer system is used to achieve a fine tuning of the optical fibers in the ferrules in a direction along the longitudinal axes 28—28. By impressing a voltage on the transducer, the transducers cause relative movement between the end fixtures and hence cause a change in the gap between the adjacent exposed end surfaces of the wafers 30—30.

The transducer system 44 of this invention includes four transducers 86—86 spaced equiangularly about the ferrule assemblies. Each piezoelectric transducer 86 extends between one arm 71 of one of the end plates to an aligned arm of the other one of the end plates. The piezoelectric transducers may be bonded adhesively to the arms of the end fixtures with a heat-cured epoxy.

With this arrangement, it also is possible to impress voltages selectively across one or more of the transducers. The selective actuation of one or more of the transducer causes suitable relative movement between the ferrule assemblies to change their positions relative to each other. As a result, the differential movement may be used advantageously to cause the fiber in the two ferrules assemblies to be further aligned. Advantageously, the further fine alignment which may be so achieved is that to within 0.005 dB which is about ten times better than that achieved with some of the most successful optical fiber connectors.

In use, the two ferrule assemblies 22—22 initially may be aligned in a coarse mode by the technique of a rotary splice technique until alignment is within 5 dB. An explanation of the rotary splice technique is given in U.S. Pat. No. 4,545,644 which issued on Oct. 8, 1985 in the names of George DeVeau and Calvin M. Miller.

Afterwards, the mechanical alignment may be adjusted in a fine mode. This is accomplished with the alignment set screws 82—82. Four alignment set screws are provided on the outer end of each hub 73 so that they are aligned with the small diameter portion 78 of the sleeve which is disposed in the hub. Each alignment set screw 82 extends through a threaded opening in the hub 73 and bears directly in engagement with an outer surface of the small diameter portion of the sleeve. A craftsperson turns a selected one or ones of the alignment set screws 82—82, one of which is disposed in each quadrant, which deforms the sleeve and causes it to experience translational and/or pivotal movement. As a result, each ferrule assembly 22 held by a sleeve may be caused to be moved to allow the two ferrule assemblies to be aligned in a fine mode. Tuning is caused to occur by controlling the operation of the transducer system 44 to control the relative positions of the ferrule assemblies 22—22 in a longitudinal direction. Further tuning alignment in a fine mode may be achieved electrically by actuating selectively one or more of the piezoelectric transducers 86—86.

The preferred embodiment of the invention has been described to include two end fixtures each comprising four radially extending arms and four piezoelectric transducers extending therebetween. It should be understood that the fixtures each could include two arms, for example, with two transducers extending therebetween. Other numbers of arms and transducers also could be used to provide a tunable optical filter.

It is to be understood that the above-described arrangements are simply illustrative of the invention. Other arrangements may be devised by those skilled in the art which will embody the principles of the invention and fall within the spirit and scope thereof.

We claim:

1. A tunable optical filter which is capable of having a desired bandwidth, said filter comprising:
 a first ferrule assembly having aligned passageway portions for receiving a length of optical fiber in one portion and another length in another portion thereof, the passageway portions being spaced apart by a mirror which is transverse to a longitudinal axis of the passageway portions and which is substantially closer to one end of said first ferrule assembly than to an opposite end thereof;
 a second ferrule assembly having aligned passageway portions for receiving a length of optical fiber in one portion thereof and another length in another portion thereof, the passageway portions in said second ferrule assembly being spaced apart by a mirror which is normal to a longitudinal axis of said passageway portions in said second ferrule assembly, and which is substantially closer to one end of said second ferrule assembly than to an opposite end thereof;
 optical fiber positioned in each passageway portion of each ferrule assembly;
 supporting means for holding said first and second ferrule assemblies with the axes of the passageways aligned and with said one end of said first ferrule assembly being adjacent to said one end of said second ferrule assembly; and
 adjustable means for causing adjacent said one ends of the ferrule assemblies to have a predetermined axial spacing and for causing said one ends of the ferrule assemblies to experience translational and/or pivotal movement with respect to each other to provide a suitably low loss alignment of the optical fibers.

2. The filter of claim 1, which includes means connected to said supporting means for adjusting electronically the axial spacing of the fibers in said first and second ferrule assemblies.

3. The filter of claim 2, wherein said means for adjusting electronically includes piezoelectric transducers which are disposed equiangularly circumferentially about said ferrule assemblies and wherein voltage may be impressed selectively on said transducers to cause the fibers to be aligned.

4. The filter of claim 3, wherein said supporting means includes two sleeves each for holding one of said ferrule assemblies to align approximately the optical fibers within said ferrule assemblies; and
 means for securing said ferrule assemblies in said sleeves; and wherein said adjustable means includes separate means disposed within said supporting means for deforming slightly each said sleeve to align accurately the fibers.

5. The filter of claim 4, wherein said supporting means includes two end fixtures each of said end fixtures including a hub having a plurality of arms extending radially therefrom with a transducer extending between an arm of one end fixture and an aligned arm of the other end fixture.

6. The filter of claim 5, wherein each end fixture includes four arms.

7. The filter of claim 5, wherein each end fixture includes two arms.

8. The filter of claim 5, wherein said hub of each end fixture includes a bore formed therethrough and said filter includes a stepped sleeve which is received in each said bore, each said stepped sleeve having a passageway formed therethrough for receiving a ferrule assembly.

9. The filter of claim 8, wherein each said end fixture for holding a ferrule assembly includes a plurality of mounting set screws which extend through said hub and through a flange which is connected to a small diameter portion of said sleeve to engage said ferrule assembly disposed in said sleeve.

10. The filter of claim 8, wherein said separate means includes a plurality of alignment set screws which are turned threadably through said hub to engage an outer surface of a small diameter portion of said stepped sleeve.

11. The filter of claim 10, wherein said plurality of alignment set screws are disposed in a plane transverse to a longitudinal axis of said sleeve and are spaced equally circumferentially about said sleeve.

* * * * *